Feb. 25, 1958 N. H. SANDBERG 2,824,382
COMPASSES
Filed Aug. 17, 1953 2 Sheets-Sheet 1
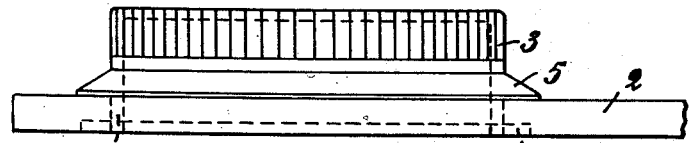
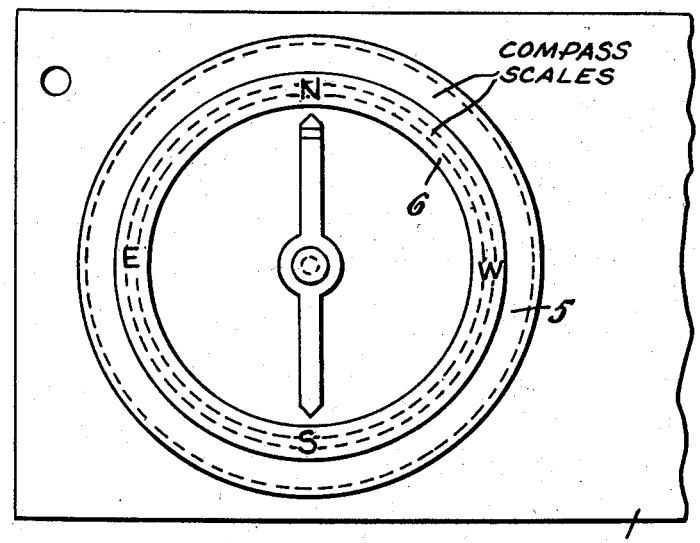
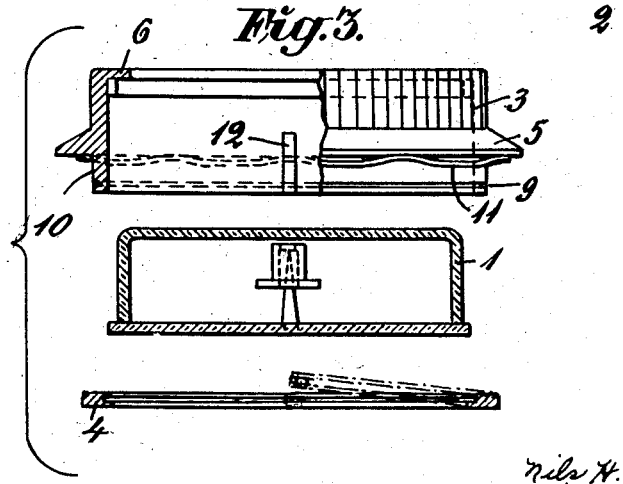
Inventor
Nils H. Sandberg
By Watson, Cole, Grindle, & Watson
Attorneys Feb. 25, 1958  N. H. SANDBERG  2,824,382
COMPASSES
Filed Aug. 17, 1953  2 Sheets-Sheet 2
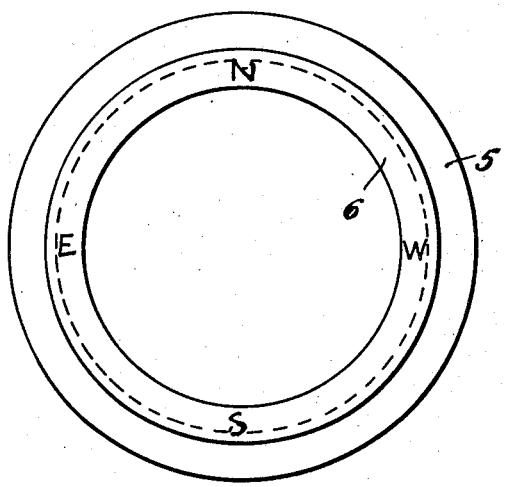
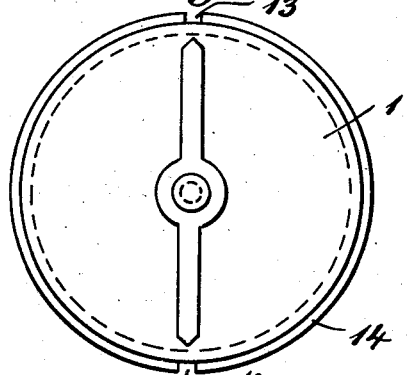
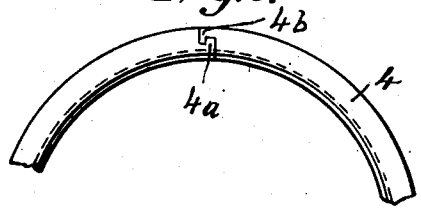
Inventor
Nils H. Sandberg
By Watson, Cole, Grindle & Watson
Attorneys

United States Patent Office 2,824,382
Patented Feb. 25, 1958

2,824,382

COMPASSES

Nils Henry Sandberg, Enskede, Sweden

Application August 17, 1953, Serial No. 374,677

2 Claims. (Cl. 33—222)

The present invention relates to compasses of the type in which the compass-box is rotatably mounted on a ruler and more particularly relates to means for rotatably securing the compass-box to the ruler. In accordance with this invention said means comprise a sleeve-shaped ring engaging the compass-box at the circumference thereof, said ring being adapted to partly project into a circular opening in the ruler and to engage from one side the edge of said ruler opening with an annular flange suitably having a scale divided into degrees, and a suitably split clamping ring adapted to engage the edge of said ruler opening from the opposite side and to engage with a groove provided in that portion of the sleeve-shaped ring which projects into the ruler opening so that when the clamping ring is received in the groove the compass-box together with the sleeve-shaped ring and the clamping ring forms a unit which is rotatably mounted on the ruler.

These and other features characteristic of this invention will be explained in detail below with reference to an embodiment form shown as an example on the appended drawings, in whcih Figures 1 and 2 show the whole compass in elevation and plan view respectively;

Figure 3 shows in longitudinal cross-section the various parts of the compass;

Figures 4 to 6 illustrate the sleeve-shaped ring, the compass-box and the clamping ring respectively in plan view.

Referring to the drawings, the means adapted to rotatably secure the compass-box 1 to the ruler 2 comprise a sleeve-shaped ring 3 and a clamping-ring 4 formed of resilient material. The ring 3 has an annular flange 5 which has a scale divided in degrees and is adapted to engage from above the edge of a circular opening 7 provided in the ruler 2, and a second annular flange 6, which has a scale divided in points of the compass. The clamping ring 4 is adapted to be received by a recess 8 in the ruler 2 and has a channel-shaped section so that with the upper flange of the channel-section it can engage a circular groove 9 in that portion 10 of the ring 3 which projects into the ruler opening 7. To facilitate positioning of the clamping ring 4 on the ring portion 10, the clamping ring may be split as seen from Figures 3 and 6 so that its free, hooked ends 4a and 4b may be moved to the position shown in Figure 3 and after positioning of the upper flange of the clamping ring in the groove 9 may be brought into engagement, locking each other. By means of a resilient ring 11 adapted to surround the ring portion 10 between the ring flange 5 and the ruler 2 or between the clamping ring 4 and the ruler 2, the angular setting of the ring 3 relatively to the ruler 2 is ensured. The compass-box 1 is secured to the ring 3 by means of projections 12 on the inner wall of the ring 3, said projections being adapted to engage corresponding recesses 13 in an annular flange 14 integral with the compass-box and disposed approximately at a level with its bottom. This also ensures the correct positioning of the compass-box 1 relatively to the scales of the ring 3.

The compass is assembled in the following manner:

The compass-box is introduced from below into the ring 3 so that the projections 12 of the ring 3 are caused to engage the recesses 13 of the annular flange 14. Thereupon the resilient ring 11 is positioned on the ring portion 10 whereupon this portion is introduced in the ruler opening 7 and the clamping ring 4 is caused to engage the groove 9. The clamping ring 4 thereby presses from below and the annular flange 5 from above against the ruler 2 with such pressure that the compass-box 1 together with the two rings 3 and 4 form an assembly which is rotatable on the ruler.

Having now particularly described the nature of my invention and the manner of its operation what I claim is:

1. A ruler-compass assembly comprising a ruler having a circular opening therein, a sleeve-shaped ring rotatably mounted on said ruler and partially projecting into said opening, and having an annular flange thereon engaging one surface of said ruler adjacent said opening, said flange having a scale thereon which is divided into degrees, a compass-box received within said ring, mating projections and recesses being formed on the inner and outer peripheral surfaces of said ring and compass-box, respectively, to prevent relative rotation therebetween, said ring having a circular groove adjacent the edge of that portion which projects into said ruler opening, a split clamping ring engaging said groove and the other surface of said ruler adjacent said opening to retain said ring and the box received thereby, as a unit, in said opening and a resilient ring adapted to surround that portion of the sleeve-shaped ring which projects into the ruler opening, between the edge of the ruler opening and the annular flange, said sleeve-shaped ring having an annular flange engaging the compass-box from above and having thereon a compass scale, recesses and projections on said sleeve-shaped ring and mating recesses and projections on said annular flange of said compass-box, said clamping ring being adapted to be received by a recess in the ruler.

2. A ruler-compass assembly in accordance with claim 1 wherein said clamping ring has hooked ends at the place of split adapted to engage with and lock each other.

References Cited in the file of this patent

UNITED STATES PATENTS

| 1,652,272 | Dawson | Dec. 13, 1927 |
| 2,104,108 | Webb | Jan. 4, 1938 |
| 2,139,519 | Schmitt | Dec. 6, 1938 |

FOREIGN PATENTS

| 782,576 | France | Mar. 18, 1935 |
| 445,312 | Great Britain | Apr. 7, 1936 |
| 471,140 | Great Britain | Aug. 30, 1937 |
| 117,137 | Sweden | Sept. 3, 1946 |
| 248,239 | Switzerland | Feb. 2, 1948 |